(12) United States Patent
Wong et al.

(10) Patent No.: US 9,105,081 B2
(45) Date of Patent: Aug. 11, 2015

(54) PROTECTION FILTER FOR IMAGE AND VIDEO PROCESSING

(75) Inventors: Daniel Wong, Cupertino, CA (US); Peter Cao, Markham (CA)

(73) Assignee: ATI Technologies ULC, Markham, Ontario (CA)

( * ) Notice: Subject to any disclaimer, the term of this patent is extended or adjusted under 35 U.S.C. 154(b) by 1175 days.

(21) Appl. No.: 12/206,404

(22) Filed: Sep. 8, 2008

(65) Prior Publication Data

US 2010/0061648 A1    Mar. 11, 2010

(51) Int. Cl.
- *H04N 7/50* (2006.01)
- *G06T 5/00* (2006.01)
- *G06T 5/20* (2006.01)
- *G06T 5/50* (2006.01)

(52) U.S. Cl.
CPC ............... *G06T 5/002* (2013.01); *G06T 5/003* (2013.01); *G06T 5/20* (2013.01); *G06T 5/50* (2013.01); *G06T 2207/10016* (2013.01); *G06T 2207/20182* (2013.01); *G06T 2207/20201* (2013.01)

(58) Field of Classification Search
CPC .. H04N 7/26888; H04N 7/26058; H04N 7/50
USPC ............................. 382/260, 275; 375/240.29
See application file for complete search history.

(56) References Cited

U.S. PATENT DOCUMENTS 6,175,656 B1 *    1/2001    Hoang ............................ 382/260
7,016,415 B2 *    3/2006    Alvarez .................... 375/240.16

* cited by examiner

*Primary Examiner* — Andy Rao
(74) *Attorney, Agent, or Firm* — Faegre Baker Daniels LLP (57) ABSTRACT

A filter includes a conventional filtering block and a protection block. The conventional filtering block receives input values and provides filtered values. The protection block receives filtered values and a group of input values proximate the current input, to ensure that the output is lies within a range computed for the current input. The range is determined by the protection block based on the group of input values proximate the current input. Any algorithm or statistical function may be applied to the group of input values to determine the range. If a filtered value provided by the conventional filtering block is outside the range, then the protection block computes and outputs a value that is within the range. The filter may be used in temporal or spatial filtering of images and video to mitigate artifacts such as motion artifacts and static artifacts.

12 Claims, 6 Drawing Sheets

| $X_{i-p,j-q}[n]$ | ... | | | | ... | $X_{i+p,j-q}[n]$ |
|---|---|---|---|---|---|---|
| ⋮ | ⋮ | ⋱ | ⋮ | ⋮ | ⋰ | ⋮ |
| | ... | $X_{i-1,j-1}[n]$ | $X_{i,j-1}[n]$ | $X_{i+1,j-1}[n]$ | ... | |
| | ... | $X_{i-1,j}[n]$ | $X_{i,j}[n]$ | $X_{i+1,j}[n]$ | ... | |
| | ... | $X_{i-1,j+1}[n]$ | $X_{i,j+1}[n]$ | $X_{i+1,j+1}[n]$ | ... | |
| ⋮ | ⋮ | ⋰ | ⋮ | ⋮ | ⋱ | ⋮ |
| $X_{i-p,j+q}[n]$ | ... | | | | ... | $X_{i+p,j+q}[n]$ |

PROTECTION FILTER FOR IMAGE AND VIDEO PROCESSING

FIELD OF THE INVENTION

The present invention relates generally to digital image processing, and more particularly to protective filter blocks for use with filtered output samples such as temporally alpha-blended image pixels or outputs of spatial filters whose convolution kernels contain negative coefficients.

BACKGROUND OF THE INVENTION

Noise reduction filters for digital images and video are known. Several types of noise reduction filters exist. For example, spatial filters are used to remove noise spatially distributed within a given digital image or a given video frame. Simple spatial filtering algorithms may divide images into blocks of pixels and use block averaging to remove noise.

In digital video, temporal filtering is also used to remove noise in video frames. Temporal filtering exploits the high degree of correlation between pixels of successive frames in a video sequence. For example, filtering two or more corresponding pixels from multiple successive frames removes temporal noise.

Simple temporal filtering techniques include frame averaging in which a pixel in a current frame may be replaced by an average value of current and previous pixel values at the pixel location. Other schemes may use variable weights or filter coefficients to control the relative contribution of pixels from the current frame and pixels from previous frames. Weighted averaging of pixels from previous and current frames is also known as alpha-blending. More sophisticated techniques apply decision filters on every pixel position to non-linearly alpha-blend pixels in current and previous frames to improve image resolution.

Known noise reduction filters typically include a feedback loop to obtain pixel values of previous frames or pixel locations, so that they can be averaged, alpha-blended or otherwise combined with current pixels.

Unfortunately, there are drawbacks associated with known temporal reduction filters. While simple temporal noise reduction filters can effectively remove temporal noise, they may also lead to motion and static artifacts.

Motion artifacts are caused by combining or averaging pixels from different objects. When objects are in motion, pixel locations associated with an object in a previous frame, may be associated with another object in the current frame. Combining corresponding locations from a previous frame and a current frame may thus lead to pixels of different objects being blended. As an object moves its position across multiple frames, the blending process may create a ghostly contour that follows the object's motion. This in turn typically results in motion blur or a motion artifact.

On the other hand, even when there is no motion, static artifacts can result from combining pixels from two different but relatively static scenes. When a scene change boundary in a video sequence, there is little or no correlation of the first frame from the current scene, with the last frame from the previous scene. Averaging uncorrelated frames typically leads to slow transitions, leading to artifacts that resemble motion blur. In particular, when the new scene contains a large area of dark pixels that remain static for some time, the alpha-blending process could cause a faded image from the previous scene to remain visible for a long period of time, causing a noticeable static artifact. Such static artifacts are particularly noticeable in dark regions of a frame.

Previously known attempts to counter such drawbacks include precluding alpha-blending in dark areas of frames. Other known methods include reducing the noise threshold in the non-linear filtering process. Unfortunately both methods tend to achieve a smaller probability of motion or static artifacts at the expense of reduced effectiveness in noise removal.

Similarly, spatial filters that contain negative coefficients in their convolution kernels can cause overshoot and/or undershoot at edge boundaries, leading to false contours along strong edges commonly known as ringing artifacts. In the past, a typical solution involved choosing filters with a cutoff frequency very close to the Nyquist frequency. However, this approach may not work well with video inputs that contain mixed-in graphics and other overlays. Better scalers are needed to maintain video image sharpness and at the same time preserve high quality graphics and overlays.

Accordingly, there is a need for an effective protection filter for use with digital images and video, to reduce static and motion artifacts that may result from: temporal alpha-blending of pixels, convolution kernels with negative coefficients, and the like.

SUMMARY OF THE INVENTION

An exemplary filtering method bounds output values to lie within a range computed from input values. Exemplary filters include a conventional filtering block and a protection block. The conventional filtering block receives the input values and provides filtered values. The protection block receives the filtered values, and provides outputs that are bounded within a range computed from the inputs. The range is determined by the protection block using a group of input values proximate the current input. Exemplary filters may be used in temporal or spatial filtering of images and video. An input pixel may be provided to the conventional filtering block while a larger group of pixels surrounding the same input pixel may be provided to the protection block. The protection block may use the group of pixels in the spatial neighborhood of the current input pixel to compute bounds for the output pixel. This may help mitigate motion artifacts and static artifacts, by limiting the distortion that may result when an input pixel is erroneously blended with pixels from different objects or from different scenes.

In accordance with one aspect of the present invention, there is provided a digital filter. The digital filter includes a filtering block that receives an input value from an input signal and providing a filtered value; and a protection block. The protection block includes: an input for receiving the filtered value, and a group of values proximate the input value in the input signal; and control logic for computing minimum and maximum bounds based on the group of values. The control logic forms an output value from the filtered value, such that the output value lies within the range of the bounds.

In accordance with another aspect of the present invention, there is provided a digital filter including: a filter block receiving an input value from an input signal and providing a filtered value; and a protection block. The protection block includes: an input for receiving the filtered value, and a group of values proximate the input value in the input signal; an output for providing an output value; and control logic for computing a set of all possible output values corresponding to the input value based on the group of values, the logic forming and providing the output value by selecting an element of the set.

In accordance with another aspect of the present invention, there is provided a spatial filter including a scaling block and a protection block. The scaling block scales an input image made up of input pixels, to provide a scaled image made up of scaled pixels. The scaling block provides a scaled pixel corresponding to at least one of the input pixels. The protection block includes: an input for receiving the scaled pixel, and a group of pixels proximate the at least one pixel in the input image; and control logic to compute minimum and maximum bounds for the scaled pixel based on the group of pixels. The control logic provides an output value corresponding to the scaled pixel such that the output value lies within the range of the bounds.

In accordance with another aspect of the present invention, there is provided a device including a processor in communication with memory, the memory storing processor executable instructions causing the processor to: receive a current input value in an input signal; receive a group of input values proximate the input value in the input signal; filter the input value to provide a filtered value; compute a minimum bound and a maximum bound for the filtered value based on the group of input values proximate the input value in the input signal; and form an output value from the filtered value such that the output value lies within the range of the bounds; and to finally provide the output value.

Other aspects and features of the present invention will become apparent to those of ordinary skill in the art upon review of the following description of specific embodiments of the invention in conjunction with the accompanying figures.

BRIEF DESCRIPTION OF THE DRAWINGS

In the figures which illustrate by way of example only, embodiments of the present invention.

DETAILED DESCRIPTION

The use of conventional filters for temporal and spatial filtering of video input is known. Both finite impulse response (FIR) filters and infinite impulse response (IIR) filters may be used for temporal as well as spatial filtering.

Unfortunately however, the use of conventional filters in image processing presents difficulties. As noted, conventional filtering aimed at temporal noise reduction can lead to motion and/or static artifacts. Motion artifacts are caused by the blending of pixels representing different objects during the filtering process. For an object in motion, pixel locations associated with the object in a current frame, may be associated with another object or a background within the succeeding or preceding frame. This is because a moving object may shift positions from one frame to another. Combining or blending pixels from different frames that correspond to different objects, during filtering typically results in motion blur or a motion artifact.

Figure 1:
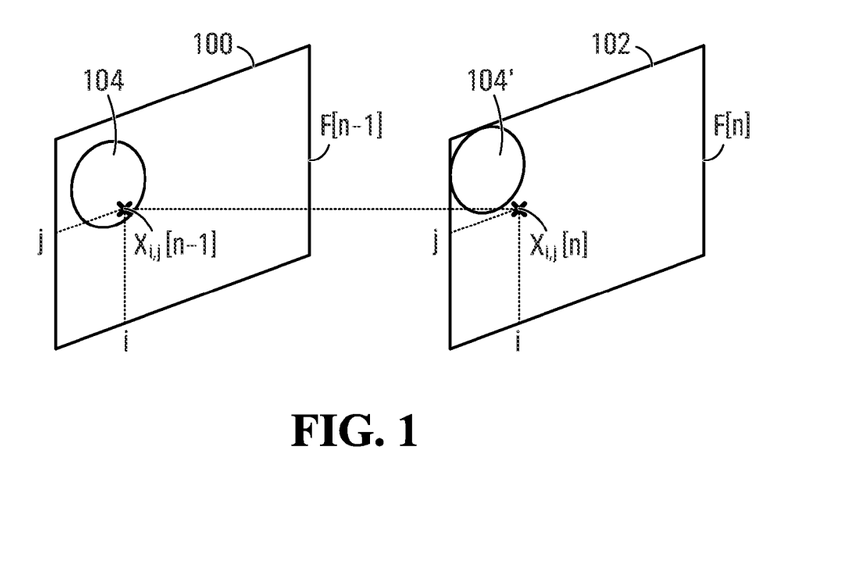
FIG. 1 is a block diagram two consecutive frames in a video sequence depicting an object in motion.

This scenario is illustrated in FIG. 1. In a frame 100 labeled $F_{n-1}$, pixel $X_{i,j}[n-1]$ at location (i,j) of frame $F_{n-1}$ is part of a set of pixels 104 corresponding to an object that is in motion. In the next frame 102 also labeled $F_n$, a new set of pixels 104' corresponds to the object in motion. As can be seen, new set of pixels 104' has shifted upwards with respect to the previous set of pixels 104, and consequently does not include pixel $X_{i,j}[n]$ at location (i,j) of frame $F_n$.

A conventional temporal filter would typically average $X_{i,j}[n]$ and $X_{i,j}[n-1]$ to output $Y_{i,j}[n]$. Since $X_{i,j}[n]$ and $X_{i,j}[n-1]$ are not correlated (due to the movement of the underlying object), the output $Y_{i,j}[n]$ corresponding to pixels near the edge or boundary of an object in motion may exhibit a motion artifact.

Similarly, pixels from two consecutive frames, that are at the same location (i,j) may not be correlated at a temporal boundary of a scene change. Thus if previous frame $F_{n-1}$ belongs to a previous scene while current frame $F_n$ belongs to a new or current scene, then the pixels $X_{i,j}[n]$, $X_{i,j}[n-1]$ at pixel location (i,j) in $F_n$ and $F_{n-1}$ respectively, would not be correlated. As a consequence, a static artifact may be observed near location (i,j) in the output frame, if conventional filters described above are used. In particular, if the initial frames $F_n$, $F_{n+1}$, ... from a new scene contain a large area of dark pixels, the temporal filtering could cause a faded image from the previous scene $F_{n-1}$ to be visible within the dark areas of $F_n$, $F_{n+1}$, ....

Figure 2:
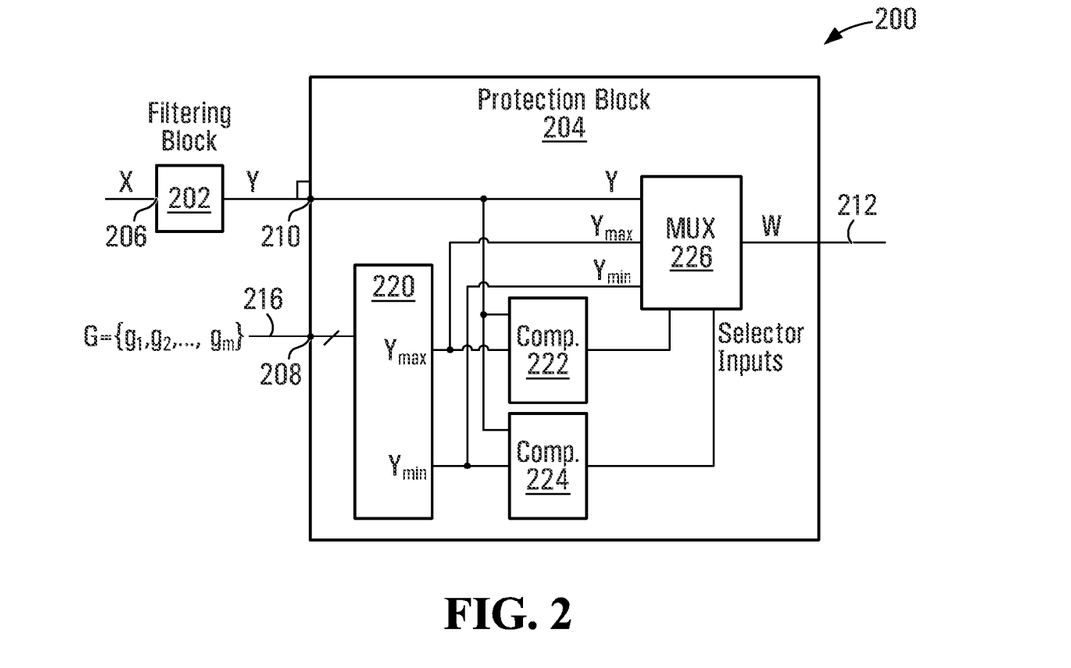
FIG. 2 is a detailed block diagram of a filter exemplary of an embodiment of the present invention.

To overcome these disadvantages, in one exemplary embodiment of the present invention, an exemplary filter that incorporates a protection block, in addition to a filtering block, is provided. FIG. 2 depicts a block diagram of an exemplary embodiment of a filter 200. As depicted, filter 200 includes a filtering block 202 which may be a conventional filter, and a protection block 204. Protection block 204 may be cascaded with filtering block 202 as shown. Filtering block 202 may have an input 206 for receiving an input signal, while protection block 204 has inputs 208, 210 and an output node 212 which also serves as the output node for filter 200.

Filtering block 202 receives an input value X from an input signal to provide a filtered value Y. Protection block 204 may use inputs 208, 210 for receiving filtered value Y (from filtering block 202) and a group of values $G=\{g_1, g_2, \ldots g_M\}$ proximate input value X in the input signal respectively. Bus 216 may be used to provide the group of input values G proximate the input value X, to protection block 204. The group of values in the input signal, may be proximate the input value X in time or in space as will be detailed below.

Protection block 204 may include control logic including a computation block 220, comparators 222, 224 and a multiplexer 226. Computation block 220 may be used to provide bounds for the output of filter 200. For example, computation block 220 may receive the group of input values G proximate the input value X, and compute minimum and maximum bounds $Y_{min}$ and $Y_{max}$. Inputs to comparators 222, 224 may be interconnected to outputs for computation block 220 as shown. Minimum and maximum bounds $Y_{min}$ and $Y_{max}$ output by computation block 220 may be provided to comparators 224, 222 respectively as inputs.

As shown, multiplexer 226 interconnects filtering block 202 and receives the output Y of filtering block 202 corresponding to input value X from an input signal received in filtering block 202. Multiplexer 226 may also interconnect computation block 220 and comparators 222, 224. Thus, in addition to filtered value Y, minimum and maximum bounds $Y_{min}$ and $Y_{max}$ computed by computation block 220 are also provided to multiplexer 226 as inputs.

Comparators 222, 224 compare filtered value Y with $Y_{max}$ and $Y_{min}$ respectively and output a signal indicative of the comparison operation. The outputs of comparators 222, 224, may then be used as selector inputs by multiplexer 226 to selectively provide either Y, $Y_{min}$ or $Y_{max}$ as output value W so that $Y_{min} \le W \le Y_{max}$. In other words, protection block 204 ensures that the output value W lies within the range defined by of the bounds $Y_{min}$ and $Y_{max}$.

Figure 3:
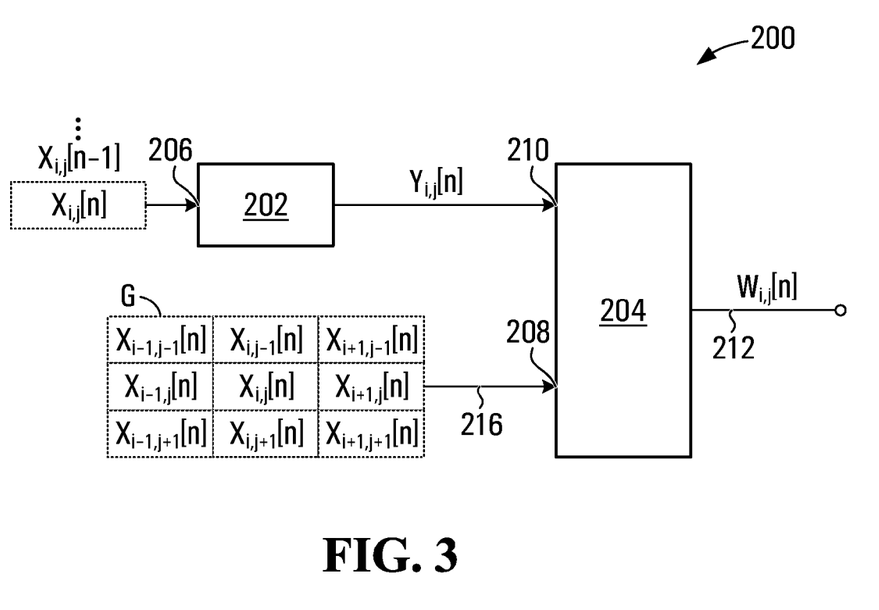
FIG. 3 is a block diagram of a temporal filter exemplary of an embodiment of the present invention.

FIG. 3 depicts a block diagram of filter 200 of FIG. 2 used as a temporal filter. Filtering block 202 accepts an input pixel $X_{i,j}[n]$ to produce a filtered pixel $Y_{i,j}[n]$. The input signal to filter 200 may include pixels $X_{i,j}[n], X_{i,j}[n-1], X_{i,j}[n-2], \ldots$ which correspond to pixels at location (i,j) in a sequence of video frames $F_n, F_{n-1}, F_{n-2}, \ldots$ respectively. The input signal may also include pixels $W_{i,j}[n-1], W_{i,j}[n-2], \ldots$ from previous outputs. Input 210 may be used for receiving $Y_{i,j}[n]$ from filtering block 202. In the embodiment depicted in FIG. 3, input 208 is used for receiving a group of pixels G surrounding input pixel $X_{i,j}[n]$ in $F_n$. Protection block 204 outputs $W_{i,j}[n]$ at its output node 212. Again, the group of pixels G proximate input pixel $X_{i,j}[n]$ may be provided to protection block 204 using a bus 216.

In the depicted embodiment, the group of pixels G received by protection block 204 through its input 208 may be a P×Q block of pixels in $F_n$ that includes $X_{i,j}[n]$ at its center. For example, a 3×3 block of pixels symmetrically arranged around input pixel $X_{i,j}[n]$ is shown in FIG. 3. The 3×3 block of pixels corresponds to nine pixel values of $\{X_{i-1,j-1}[n], X_{i-1,j}[n], X_{i-1,j+1}[n], X_{i,j-1}[n], X_{i,j}[n], X_{i,j+1}[n], X_{i+1,j-1}[n], X_{i+1,j}[n], X_{i+1,j+1}[n]\}$. However, the 3×3 block depicted is only exemplary, and a larger or smaller group of pixels having rectangular, circular, or arbitrary shapes may be used.

Figure 4:
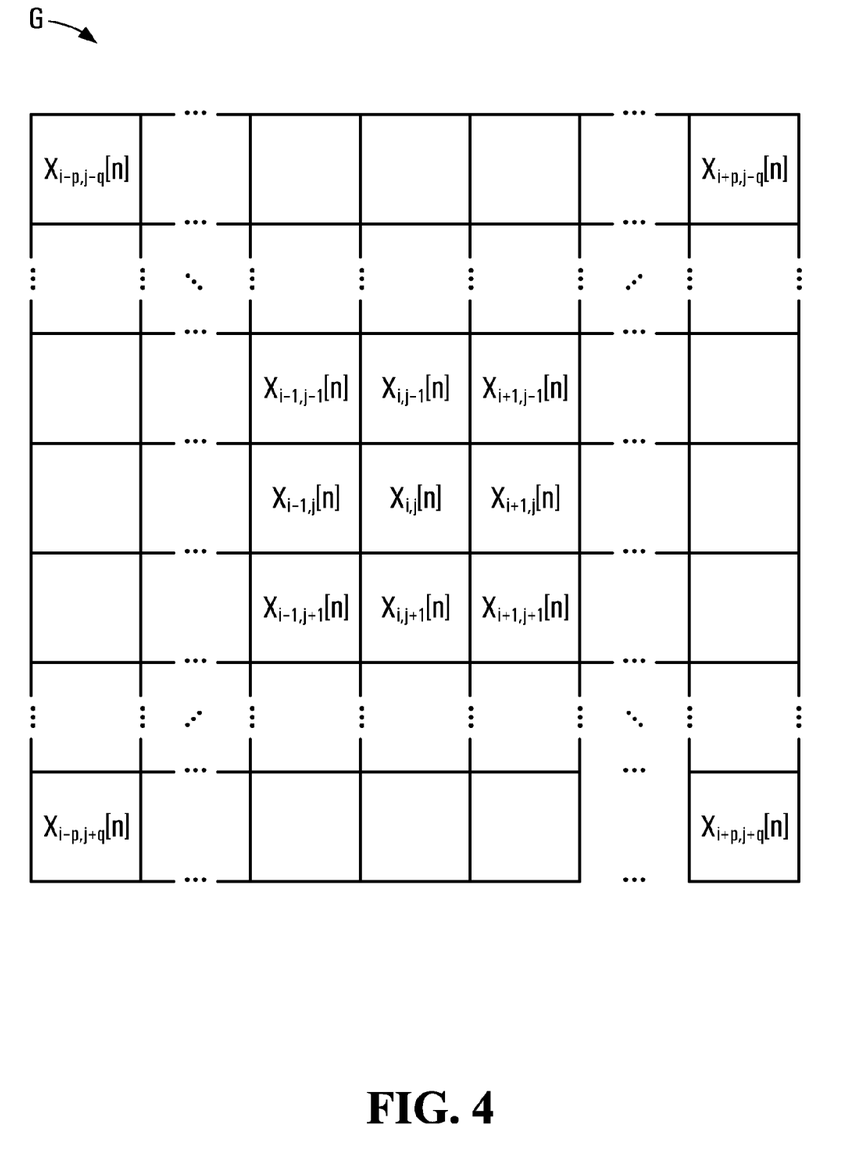
FIG. 4 is a block diagram of a general representation for the group of pixels provided to the protection block of FIG. 3.

For example, a more general rectangular group of pixels G, which may be a P×Q block or matrix of values centered around $X_{i,j}[n]$ is depicted schematically in FIG. 4. As depicted, the group of pixels G is represented as a P×Q block of pixels, where P=2p+1 and Q=2q+1.

In alternate embodiments the block of pixels need not be perfectly symmetric around $X_{i,j}[n]$ but may have for example, more or fewer rows/columns of pixels above/below or to the left/right of pixel $X_{i,j}[n]$. In addition, the group of pixels G may take on an arbitrary size and shape. For example, any combination from the set of pixels surrounding $X_{i,j}[n]$ may be used.

Filtering block 202 may be any type of conventional filter, and may include delay elements, multipliers and memory. For example, filtering block 202 may be a conventional temporal filter accepting pixel values $X_{i,j}[n], X_{i,j}[n-1], X[n-2] \ldots$, optionally $W_{i,j}[n-1], W_{i,j}[n-2] \ldots$, at a fixed location (i,j) to provide a temporally filtered value $Y_{i,j}[n]$.

Protection block 204 may serve to limit the amount of distortion that could result from the use of a filtering block 202 alone, relative to the neighboring pixels of the original input $X_{i,j}[n]$. Protection block 204 achieves this aim by computing minimum and maximum bounds $Y_{min}$ and $Y_{max}$ respectively, for the output $Y_{i,j}[n]$ of filtering block 202, based on the neighboring group of pixels G received via input 210.

The group of pixels G surrounding $X_{i,j}[n]$ may take an arbitrary shape such as a triangular, rectangular, other polygonal shapes, circular or elliptical regions; a vertical, diagonal or horizontal line of pixels, or the like. This allows unusual deviations in filtered pixel output $Y_{i,j}[n]$ which may be caused by temporal alpha-blending of a pixel $X_{i,j}[n]$ with other pixels (e.g., $X_{i,j}[n-1], X_{i,j}[n-2]$ belonging to a different scene), to be smoothed out and replaced by a more realistic pixel value $W_{i,j}[n]$ as determined by the protection block based on neighboring values proximate $X_{i,j}[n]$ in the current input frame.

The values $Y_{min}[n], Y_{max}$ may be computed as some functions of the pixels in group of pixels G surrounding $X_{i,j}[n]$.

Figure 5:
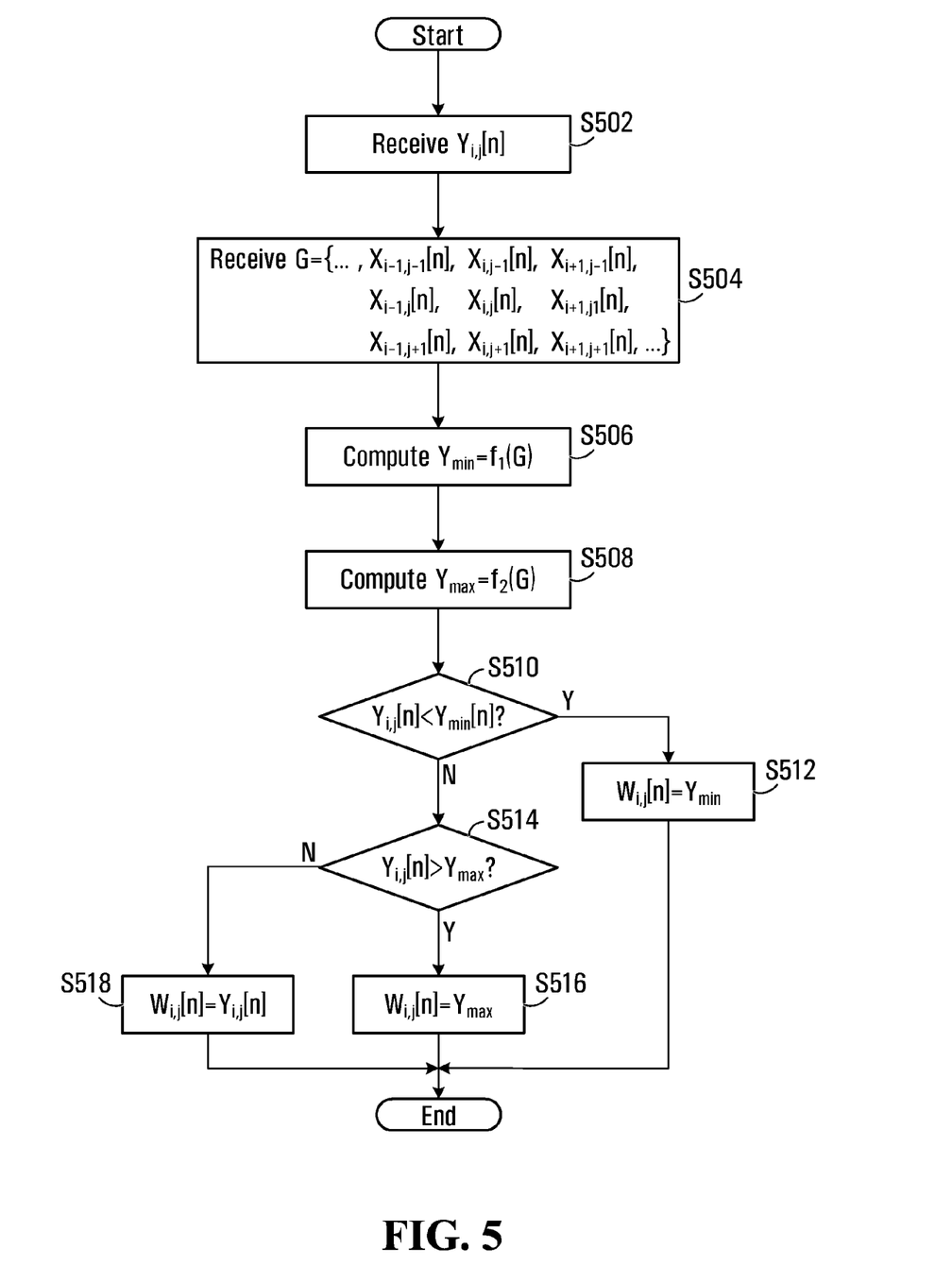
FIG. 5 is a flowchart depicting the operation of the protection filter that forms part of the filter of FIG. 3.

FIG. 5 depicts a flowchart that outlines an exemplary operation of protection block 204. Protection block 204 receives as input the group of pixels G surrounding $X_{i,j}[n]$; and also the output of filtering block 202 $Y_{i,j}[n]$ and after some processing, outputs $W_{i,j}[n]$. As depicted, protection block 204 may initially receive $Y_{i,j}[n]$ (S502) and a group of pixels G={ ..., $X_{i-1,j-1}[n], X_{i-1,j}[n], X_{i-1,j+1}[n], X_{i,j-1}[n], X_{i,j}[n], X_{i,j+1}[n], X_{i+1,j-1}[n], X_{i+1,j}[n], X_{i+1,j+1}[n], \ldots$ } proximate or neighboring $X_{i,j}[n]$ (S504). Alternately, $Y_{i,j}[n]$ and a group of pixels G may also be received simultaneously (that is, blocks S502, S504 may take place simultaneously).

Protection block 204 subsequently computes $Y_{min}$ using the group of pixels G as input to some function $f_1$ (S506). This may be accomplished by computation block 220. Here $f_1=f_1(G)$ is any suitable function of which maps the group of pixels G surrounding $X_{i,j}[n]$ or proximate $X_{i,j}[n]$ to a value $Y_{min}$. Accordingly, $f_1$ may be any type of function based on the input pixels near $X_{i,j}[n]$. For example, $f_1$ may simply select the smallest pixel value among the input pixels in G and present it as $Y_{min}$. Alternately, if G={$g_1, g_2, \ldots g_M$} has M values or elements, then $f_1$ may average the smallest N pixel values in G (for N<M), to compute $Y_{min}$. In addition $Y_{min}$ may be computed using other statistical functions involving medians, averages, standard deviations, ratios and the like.

Protection block 204 may then compute $Y_{max}$ using the same group of pixels G as an input to some other function $f_2$ (S508). Again, $f_2=f_2(G)$ is some function of the group of pixels G near $X_{i,j}[n]$, and may be of any type. Thus for example, $f_2$ may simply select the largest pixel value among the input pixels in G, as $Y_{max}$. Again, if G={$g_1, g_2, \ldots g_M$} has M values or elements then $f_2$ may average the largest few pixel values in G, to compute $Y_{max}$ (e.g., $f_2$ may average the largest N values in G for N<M). Alternately, $Y_{max}$ may be selected using other statistical functions involving medians, averages, standard deviations and the like in manners similar to the computation of $Y_{min}$. This may also be accomplished by computation block 220 in FIG. 2.

Functions $f_1$ and $f_2$ need not conform to any type of function. The functions may for example be linear or non-linear functions of the group of input values G that are proximate $X_{i,j}[n]$. In addition, transform domain techniques, statistical functions, geometric transforms or any other transformations or data manipulations may be used to arrive at $Y_{min}$ and $Y_{max}$.

In the exemplary operation depicted in FIG. 5, if the filtered value of $Y_{i,j}[n]$ falls below $Y_{min}$ (S510) then protection block 204 would adjust the output of filtering block 202 (S512) and output a value $W_{i,j}[n]$ that is within the computed range—that is, $W_{i,j}[n] \ge Y_{min}$ (e.g., by setting $W_{i,j}[n]=Y_{min}$) Similarly, if the value of $Y_{i,j}[n]$ or exceeds $Y_{max}$ (S514), then protection block 204 would adjust the output of filtering block 202 (S516) and output $W_{i,j}[n]$ that is within the computed limit so that $W_{i,j}[n] \le Y_{max}$ (e.g., by setting $W_{i,j}[n]=Y_{max}$).

In other words, the output $W_{i,j}[n]$ is set by clipping $Y_{i,j}[n]$ so that $Y_{min} \le W_{i,j}[n] \le Y_{max}$. If the output of filtering block 202 is within acceptable bounds (i.e., $Y_{min} \le Y_{i,j}[n] \le Y_{max}$) then protection block 204 outputs the pixel value received from filtering block 202 by setting $W_{i,j}[n]=Y_{i,j}[n]$ (S518).

In alternate embodiments, $W_{i,j}[n]$ may initially be set to $Y_{i,j}[n]$, and later clipped or adjusted, if $W_{i,j}[n]$ is found to be out side the range defined by ($Y_{min}, Y_{max}$). Such an approach may be suitable for software implementation.

It may be appreciated from FIG. 5 that that by an appropriate choice of the functions $f_1, f_2$ (and therefore $Y_{min}, Y_{max}$) large distortions in the value $W_{i,j}[n]$ that may stand out visually relative to its neighboring pixels can be reduced or eliminated. Thus protection block 204 may provide a degree of protection for the output $W_{i,j}[n]$ from being severely distorted as a result of movement of objects or scene changes. Motion artifacts as well as static artifacts would thus be reduced.

Embodiments of the present invention may also be used in spatial filtering. In particular, a filter 200' similar to filter 200 may be employed to protect the output of a scaling unit.

Figure 6:
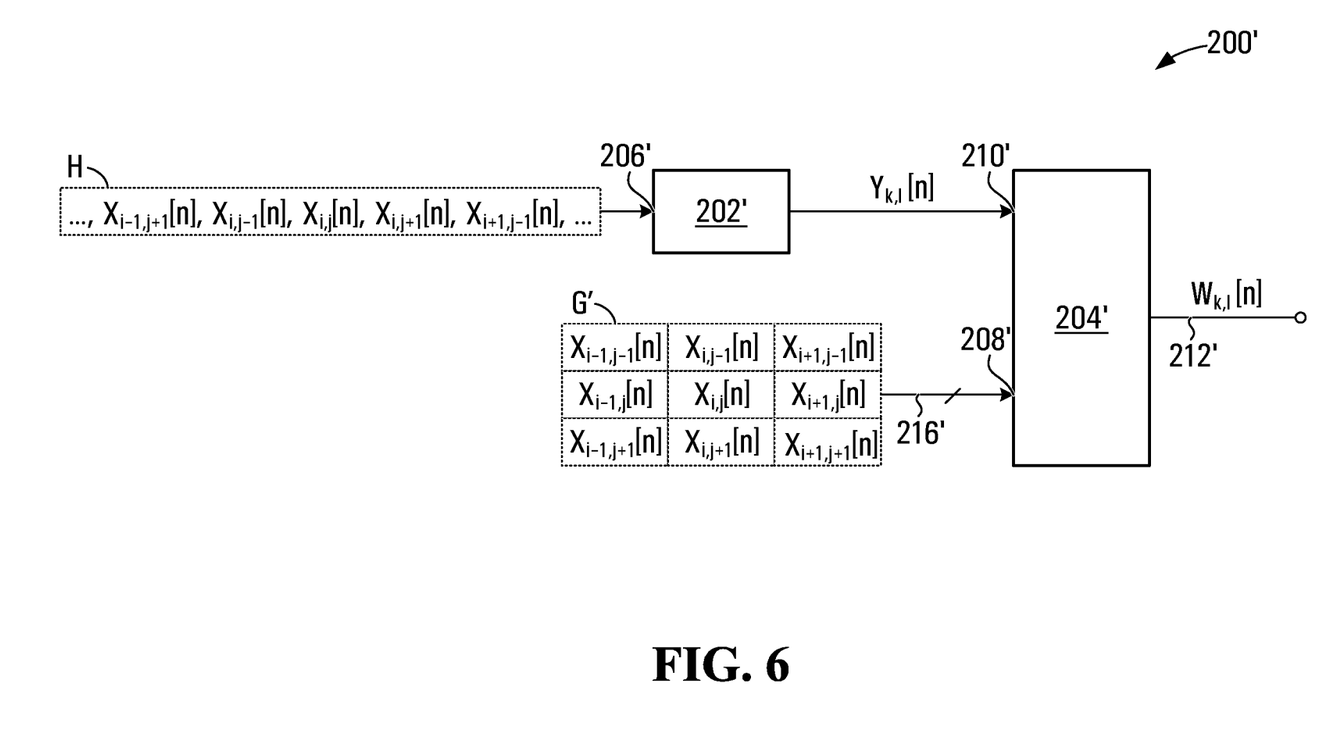
FIG. 6 is a block diagram of spatial filter exemplary of an embodiment of the present invention.

Accordingly FIG. 6 depicts filter 200' that includes a scaling block 202' that accepts input pixel including $X_{i,j}[n]$ of a frame or image to be scaled, and outputs scaled image pixels including pixel $Y_{k,l}[n]$ corresponding to at least $X_{i,j}[n]$ and possibly other input pixels. In addition filter 200' includes a protection block 204' which is interconnected to scaling block 202' as shown.

As the scaled image is typically of a different size than the dimensions of the input image, there may not be a one-to-one correspondence between input image pixels $X_{i,j}[n]$ and scaled image pixels $Y_{k,l}[n]$. As may be appreciated, possible index values for (i,j) would be typically smaller than the corresponding range for index values (k,l) of the enlarged scaled frame or image.

Protection block 204' has inputs 208', 210'. Input 210' is used for receiving $Y_{k,l}[n]$ from scaling block 202' and while input 208' is used for receiving a group of pixels G' proximate an input pixel (e.g., $X_{i,j}[n]$) that corresponds to $Y_{k,l}[n]$ using for example, a bus 216'.

Scaling block 202' accepts an input image made up of input pixels, to provide a scaled image containing scaled pixels. Scaling block 202' thus provides a scaled pixel $Y_{k,l}[n]$ corresponding to at least one input pixel $X_{i,j}[n]$ in the input image. Scaling block 202' may also accept spatial neighbors of $X_{i,j}[n]$ which may be denoted as H={ . . . , $X_{i-1,j-1}[n]$, $X_{i-1,j}[n]$, $X_{i-1,j+1}[n]$, $X_{i,j-1}[n]$, $X_{i,j}[n]$, $X_{i,j+1}[n]$, $X_{i+1,j-1}[n]$, $X_{i+1,j}[n]$, $X_{i+1,j+1}[n]$, . . . } as input.

Protection block 204' may receive a scaled pixel $Y_{k,l}[n]$, and a group of pixels G' proximate $X_{i,j}[n]$ in the input image. The sizes of H and G' need not be the same. Scaling block 202' may use H to form $Y_{k,l}[n]$. Protection block 204' may further use its control logic to compute minimum and maximum bounds $Y_{min}$ and $Y_{max}$ respectively for $Y_{k,l}[n]$ based on the group of pixels G' proximate $X_{i,j}[n]$ and provide an output value $W_{k,l}[n]$ corresponding to $Y_{k,l}[n]$ such that $Y_{min} \leq W_{k,l}[n] \leq Y_{max}$.

Figure 7:
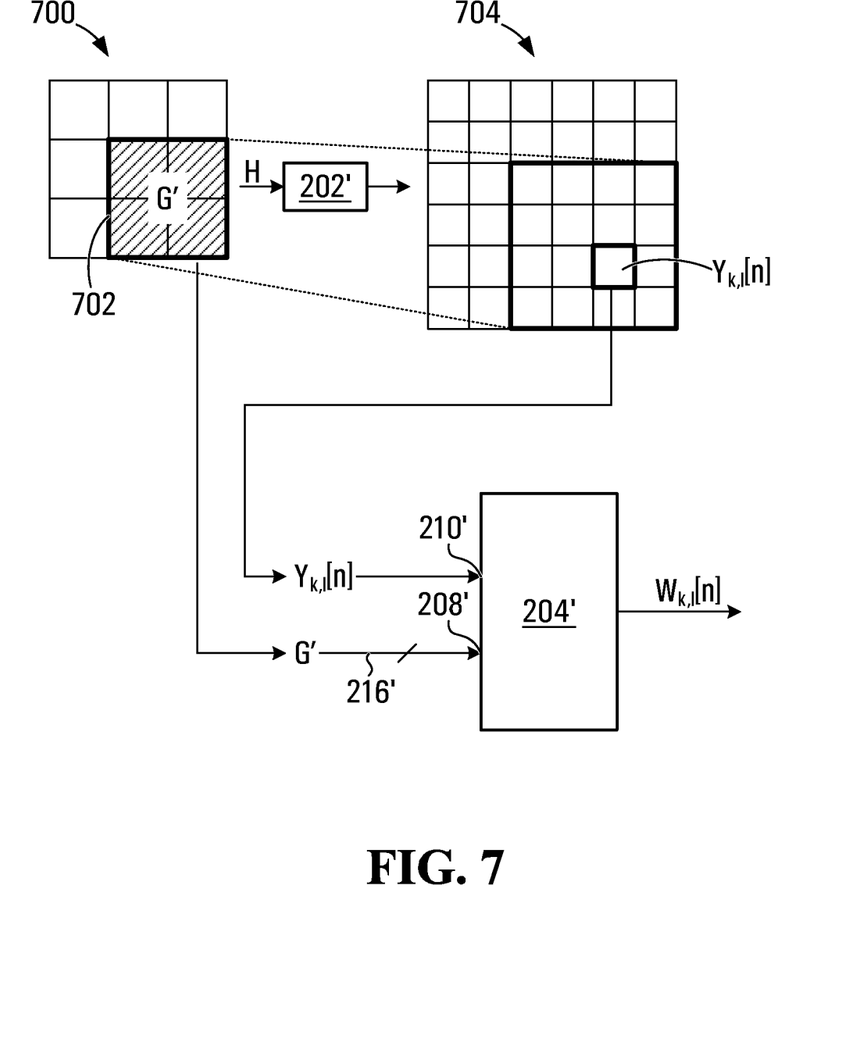
FIG. 7 is a logical block diagram representing input and output pixels into the scaling and protection blocks of the exemplary filter of FIG. 6.

The operation is illustrated in FIG. 7 which depicts a small 3×3 input image 700, scaled by scaling unit 202' into a 6×6 image 704. Scaling unit 202' may accept a group of pixels H proximate an input pixel $X_{i,j}[n]$ in the input image to provide $Y_{k,l}[n]$. Another group of pixels 702 (also denoted G') is transmitted to protection block 204' via bus 216' along with $Y_{k,l}[n]$ which is provided to protection block 204' via input 210'. As noted above, H and G' need not have the same size. To protect the scaled image pixel $Y_{k,l}[n]$, a group of pixels G' which corresponds to the depicted 2×2 block of input pixels the input image, is used to compute maximum and minimum values for $Y_{k,l}[n]$. Protection block 204' may contain logic similar to the logic depicted in FIG. 2 for protection block 204, and may compute $Y_{min}$ and $Y_{max}$ using the group of pixels G' as input to some function. This may be accomplished similarly to the manner depicted in FIG. 2. That is, for example, protection block 204' may simply select the smallest/largest pixel value among the input pixels in G' as $Y_{min}/Y_{max}$ respectively. Alternately $Y_{min}/Y_{max}$ may be selected using other statistical functions involving medians, averages, standard deviations, linear/non-linear transformations and the like. Many suitable algorithms for selecting an appropriate bound will be known to those of ordinary skill in the art.

Finally protection block 204' outputs $W_{k,l}[n]$ at output node 212' by clipping, limiting or bounding $Y_{k,l}[n]$ to $W_{k,l}[n]$ so that $Y_{min} \leq W_{k,l}[n] \leq Y_{max}$. If the output of scaling block 202' is already within acceptable bounds (i.e., if $Y_{min} \leq Y_{k,l}[n] \leq Y_{max}$) then protection block 204' may simply output the pixel value received from scaling block 202' by setting its output $W_{i,j}[n]=Y_{i,j}[n]$. Overshoots and undershoots in the output from scaling block 202' can be corrected by the bounds defined from a spatial neighborhood corresponding to output $W_{i,j}[n]$.

The range of possible output values for a given pixel or block of pixels, may also be specified by enumeration all possible values in a set, instead of computing minimum and maximum values. For example, in alternative embodiments, given an input pixel $X_{i,j}[n]$, and its nearest neighbors G={ . . . $X_{i-1,j-1}[n]$, $X_{i-1,j}[n]$, $X_{i-1,j+1}[n]$, $X_{i,j-1}[n]$, $X_{i,j}[n]$, $X_{i,j+1}[n]$, $X_{i+1,j-1}[n]$, $X_{i+1,j}[n]$, $X_{i+1,j+1}[n]$, . . . } in FIG. 3, the corresponding output pixel $W_{i,j}[n]$ may be specified as one of the pixel values in G.

That is, the output value $W_{i,j}[n]$ corresponding to input pixel $X_{i,j}[n]$ may be selected from a set of M possible output values $S=\{w_1, w_2, \ldots, w_M\}$ corresponding to G, where each element of S is determined depending on G.

In some embodiments, protection block 204/204' may have a writable register for selecting specific functions such as $f_1$, $f_2$ to use to compute $Y_{min}$, $Y_{max}$ or for dynamically adjusting parameters that affect the computed values $Y_{min}$, $Y_{max}$ depending on the video stream being filtered.

Both gray-scale and color video sequences and images may be filtered using exemplary embodiments of the present invention. In case of color images, each pixel may be specified as triples such as (R,G,B) color values in the RGB color space, or (Y,Cb,Cr) color values in the YCbCr color space. However, the input pixel value to filter 200 or filter 200' should be a single color component. Color pixels may be handled simultaneously in parallel by feeding the R, G and B values (or Y, Cb and Cr values) into three separate filters. Aggregating smaller filtering blocks to build larger, multiple-input, multiple-output filters are well known to those of ordinary skill in the art.

In addition to image and video applications, other input samples may be filtered using exemplary filters that have exemplary protection blocks to prevent unusual spikes or dips in the filtered output. Exemplary embodiments of the present invention may be used in audio processing and other digital samples derived from analog phenomena by way of analog-to-digital conversion.

Exemplary filters such as filter 200/200' may be implemented in hardware or software or a combination of hardware and software. For example, filters such as filter 200/200' may be formed as part of an application specific integrated circuit (ASIC) designed for video post processing. In addition, a processor such as a general purpose microprocessor, a central processing unit (CPU), a digital signal processor (DSP), or a graphics processing unit (GPU), in communication with memory storing processor executable instructions in the form of software code, firmware or microcode, may be programmed to implement the steps depicted in FIG. 5 or more generalized algorithms similar to those noted above.

In other words, a computing device having a processor in communication with memory may be used to carry out an embodiment of the present invention. The memory may be used to store processor executable instructions. The instructions may be executed causing the processor to receive a current input X in an input signal; to receive a group of input values proximate X in the input signal; to filter X to provide a filtered value Y; to compute a minimum bound $Y_{min}$ and a maximum bound $Y_{max}$ for Y based on the group of input values proximate X in the input signal; and to form and provide as output, a bounded value W from Y such that $Y_{min} \leq W \leq Y_{max}$.

The software code, firmware or microcode containing processor instructions to implement embodiments of the present invention may be stored in a computer readable medium such as a CD, DVD, diskette, ROM, flash memory or the like, and loaded into memory in communication with a processor, DSP or the like, as needed. Methods and devices or doing so are straightforward and easily understood by those of ordinary skill in the art.

Of course, the above described embodiments, are intended to be illustrative only and in no way limiting. The described embodiments of carrying out the invention, are susceptible to many modifications of form, arrangement of parts, details and order of operation. The invention, rather, is intended to encompass all such modification within its scope, as defined by the claims.

What is claimed is:

1. A noise reduction filter comprising:
   a temporal noise reduction filtering block receiving an input value for a pixel location in a current image frame from an input signal and computing a filtered value based on said input value and values for said pixel location in previous image frames; and
   a protection block comprising:
      an input for receiving said filtered value, and a group of values for pixels proximate said pixel location in said current image frame; and
      control logic for computing a minimum bounding value and a maximum bounding value from said group of values, excluding said filtered value and for clipping said filtered value to form an output value that is range bounded within the range of said minimum bounding value and said maximum bounding value.

2. The filter of claim 1, wherein said filtering block receives a plurality of pixels comprising $X_{i,j}[n]$, $X_{i,j}[n-1]$, $X_{i,j}[n-2]$ corresponding to location (i,j) in a sequence of video frames $F_n$, $F_{n-1}$, $F_{n-2}$, respectively; and wherein said input value corresponds to $X_{i,j}[n]$, and said group of input values proximate said input value comprise a set of pixels surrounding $X_{i,j}[n]$ in $F_n$.

3. The filter of claim 2, wherein said group of input values is a P×Q block of pixels $\{X_{i-1,j-1}[n], X_{i-1,j}[n], X_{i-1,j+1}[n], X_{i,j-1}[n], X_{i,j}[n], X_{i,j+1}[n], X_{i+1,j-1}[n], X_{i+1,j}[n], X_{i+1,j+1}[n]\}$ in $F_n$ surrounding $X_{i,j}[n]$.

4. The filter of claim 1, wherein said minimum bounding value is the smallest value in said group of values.

5. The filter of claim 1, wherein said maximum bounding value is the largest value in said group of values.

6. The filter of claim 1, wherein said group of values consists of M values, and said minimum bounding value is an average of the smallest N values in said group of values, for N<M.

7. The filter of claim 1, wherein said group of values consists of M values, and said maximum bounding value is an average of the largest N values in said group of values, for N<M.

8. A noise reduction filter comprising:
   a temporal noise reduction filter block receiving an input value for a pixel location in a current image frame from an input signal and providing a filtered value based on said input value and values for said pixel location in previous image frames; and
   a protection block comprising:
      an input for receiving said filtered value, and a group of values for pixels proximate said pixel location in said current image frame;
      an output for providing an output value; and
      clipping logic for clipping said filtered value to form an output value that is range bounded between a minimum bounding value and a maximum bounding value computed based on said group of values, excluding said filtered value.

9. A method of providing an output corresponding to a current input value in an input signal, said method comprising:
   i) receiving said input value, said input value for a pixel location in a current image frame;
   ii) receiving a group of input values for pixels proximate said pixel location in said current image frame;
   iii) computing, using a temporal noise reduction filter, a filtered value from said input value and values for said pixel location from previous image frames;
   iv) computing a minimum bound and a maximum bound for said filtered value based on said group of input values, excluding said filtered value; and
   v) forming an output value by clipping said filtered value such that said output value is range bounded between said minimum bound and said maximum bound, and providing said output value.

10. The method of claim 9, wherein said input signal comprises a sequence of input values $X_{i,j}[n]$, $X_{i,j}[n-1]$, $X_{i,j}[n-2]$ corresponding to pixels at location (i,j) in a sequence of video frames $F_n$, $F_{n-1}$, $F_{n-2}$; and said input value corresponds to $X_{i,j}[n]$.

11. A device comprising a processor in communication with memory, said memory storing processor executable instructions causing said processor to:
   i) receive a current input value for a pixel location in a current image frame in an input signal;
   ii) receive a group of input values proximate said pixel location in said current image frame;
   iii) compute a filtered value using a temporal noise reduction filter from said input value and values for said pixel location from previous image frames;
   iv) compute a minimum bound and a maximum bound for said filtered value based on said group of input values, excluding said filtered value; and
   v) form an output value by clipping said filtered value such that said output value lies is range bounded between said minimum bound and said maximum bound; and
   vi) provide said output value.

12. The device of claim 11, wherein said processor comprises one of a digital signal processor (DSP), a central processing unit (CPU) and a graphical processing unit (GPU).

* * * * *